(12) United States Patent
Hiraoka et al.

(10) Patent No.: US 9,615,554 B2
(45) Date of Patent: Apr. 11, 2017

(54) FISHING REEL

(71) Applicant: Shimano Inc., Sakai, Osaka (JP)

(72) Inventors: Hirokazu Hiraoka, Osaka (JP); Hirokazu Hashimoto, Osaka (JP)

(73) Assignee: Shimano Inc., Osaka (JP)

( * ) Notice: Subject to any disclaimer, the term of this patent is extended or adjusted under 35 U.S.C. 154(b) by 282 days.

(21) Appl. No.: 14/528,080

(22) Filed: Oct. 30, 2014

(65) Prior Publication Data
US 2015/0201598 A1  Jul. 23, 2015

(30) Foreign Application Priority Data

Jan. 23, 2014 (JP) .................................. 2014-10115

(51) Int. Cl.
*A01K 89/01* (2006.01)
*A01K 89/015* (2006.01)

(52) U.S. Cl.
CPC ............ *A01K 89/01* (2013.01); *A01K 89/015* (2013.01); *A01K 89/0192* (2015.05); *A01K 89/0193* (2015.05); *A01K 89/01121* (2015.05); *A01K 89/011223* (2015.05)

(58) Field of Classification Search
CPC .............. A01K 89/01; A01K 89/01121; A01K 89/01125; A01K 89/0155; A01K 89/016; A01K 89/0192; A01K 89/01923
See application file for complete search history.

(56) References Cited

U.S. PATENT DOCUMENTS

| 5,927,630 A | * | 7/1999 | Katayama | ............... | A01K 89/01 242/247 |
| 2002/0063181 A1 | * | 5/2002 | Yamaguchi | ........ | A01K 89/0155 242/286 |
| 2004/0041046 A1 | * | 3/2004 | Nishimura | ............. | A01K 89/00 242/310 |
| 2005/0145735 A1 | * | 7/2005 | Ikuta | ...................... | A01K 89/01 242/307 |
| 2008/0149750 A1 | * | 6/2008 | Kitajima | ................ | A01K 89/01 242/224 |
| 2008/0216383 A1 | * | 9/2008 | Pierick | ................... | A01K 89/00 43/18.1 R |

FOREIGN PATENT DOCUMENTS

JP           2004-81114 A       3/2004

* cited by examiner

*Primary Examiner* — Emmanuel M Marcelo
(74) *Attorney, Agent, or Firm* — Global IP Counselors, LLP

(57) ABSTRACT

A spinning reel includes a reel body. The real body includes a lid portion having a fitting recess and a groove. An axle bearing member fits into the fitting recess. The fitting recess includes an inner surface that contacts the axle bearing member and a bottom surface that contacts the axle bearing member. The groove is formed on the inner surface.

9 Claims, 6 Drawing Sheets

FISHING REEL

CROSS-REFERENCE TO RELATED APPLICATIONS

This application claims priority to Japanese Patent Application No. 2014-10115, filed on Jan. 23, 2014, the entirety of which is hereby incorporated by reference in its entirety.

BACKGROUND

Field of the Invention

The present invention relates to a fishing reel.

Background Information

In general, a fishing reel comprises a fitted member that comprises a fitting recess that fits the fitting member. For example, an axle bearing member, which is a fitting member, fits into the fitting recess of a fitted member. Specifically, a fishing reel comprises a reel body, which is a fitted member. The reel body comprises a fitting recess. This axle bearing member rotatably supports a drive shaft.

In general, a surface layer is formed on the reel body for various purposes. For example, Japanese Laid-Open Patent Publication No. 2004-81114 discloses a corrosion prevention layer that is formed on the reel body and a sealing layer that is formed from the top of the corrosion prevention layer by electro-deposition coating.

Generally, when electro-deposition coating a reel body, the reel body is immersed in a coating bath. For this reason, there are cases in which the paint will accumulate in the fitting recess of the reel body when it is taken out of the coating bath, and the accumulated paint will harden while still residing in the corners, etc. of the fitting recess: As a result, when the axle bearing member is being fitted into the fitting recess, the axle bearing member may not accurately fit, and the axis of the axle bearing member may be misaligned or tilted, reducing the rotational. Additionally, this problem is not limited to the reel body and the axle bearing member, as this problem can also occur between the various fitted members and the fitting members, causing a problem in which the dimensional accuracy of the entire fishing reel is reduced.

The object of the present invention is to prevent a reduction in the dimensional accuracy of the component members of a fishing reel.

A fishing reel according to one aspect of the present invention comprises a second component member. The second component member comprises a fitting recess and a groove. A first component member of the fishing reel fits into the fitting recess. The fitting recess comprises an inner surface that contacts the first component member and a bottom surface that contacts the first component member. The groove is formed on at least one of the inner surface and the bottom surface.

According to this configuration, a groove is formed on at least one of the inner surface and the bottom surface of the fitting recess. Thus, for example, when the second component member is immersed in a coating bath and then taken out of the coating bath in order to apply electro-deposition coating to the second component member, paint will not easily accumulate in the fitting recess. That is, the excess paint that has accumulated in the fitting recess can be collected in the groove, so that the paint does not easily accumulate in the fitting recess. Therefore, when the first component member fits into the fitting recess, the first component member will accurately fit in the fitting recess. As a result, a reduction in the dimensional accuracy of the fishing reel can be prevented.

Preferably, the inner surface is formed across the entire circumference of the fitting recess. According to this configuration, the first component member stably fits into the fitting recess.

Preferably, the groove is formed across the entire circumference of the end of the inner surface on the bottom surface side. According to this configuration, it is possible to reliably suppress the accumulation of liquid, such as paint, in the fitting recess.

Preferably, the second component member further comprises a side wall having an inner surface and an outer surface.

Preferably, the groove extends through the side wall from the inner surface to the outer surface. According to this configuration, liquid, such as paint, in the fitting recess can be discharged outside of the fitting recess via the groove. As a result, the accumulation of liquid such as paint in the fitting recess can be reliably suppressed.

Preferably, the second component member is configured to be hung. Then, in a state in which the second component member is hung, the groove is formed on the lower portion of the inner surface. According to this configuration, when the second component member is hung, the liquid in the fitting recess can flow into the groove.

Preferably, the first component member is an axle bearing member. Also, preferably, the second component member is a reel body. When the axle bearing member fits into the fitting recess of the reel body, a higher dimensional accuracy is required. For this reason, when the first component member is an axle bearing member and the second component member is a reel body, the present invention is especially useful.

Preferably, the second component member further comprises a coated surface that is formed by electro-deposition coating.

According to the present invention, a reduction in the dimensional accuracy of the component members of a fishing reel can be prevented.

BRIEF DESCRIPTION OF THE DRAWINGS

Referring now to the attached drawings which form a part of this original disclosure.

DETAILED DESCRIPTION OF THE EMBODIMENTS

Figure 1:
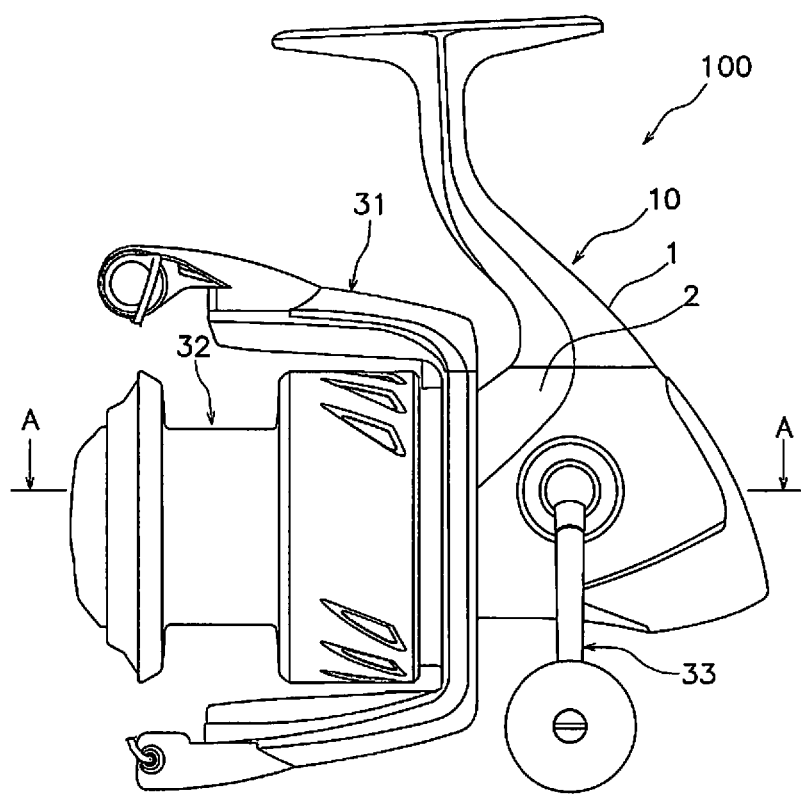
FIG. 1 is a side view of a spinning reel.

The embodiments of the fishing reel according to the present invention will be explained below, with reference to the drawings. FIG. 1 is a side view of the spinning reel (one example of a fishing reel) 100, and FIG. 2 is a cross-sectional view of the spinning reel 100.

As shown in FIG. 1, the spinning reel 100 forwardly unreels a fishing line (in the upper left direction in FIG. 1).

The spinning reel 100 comprises a reel body (one example of a second component member) 10, a rotor 31, a spool 32, and a handle 33. Also, as shown in FIG. 2, the spinning reel 100 further comprises a drive mechanism 34, an oscillating mechanism 35, a pinion gear 36, and a spool shaft 37.

Figure 2:
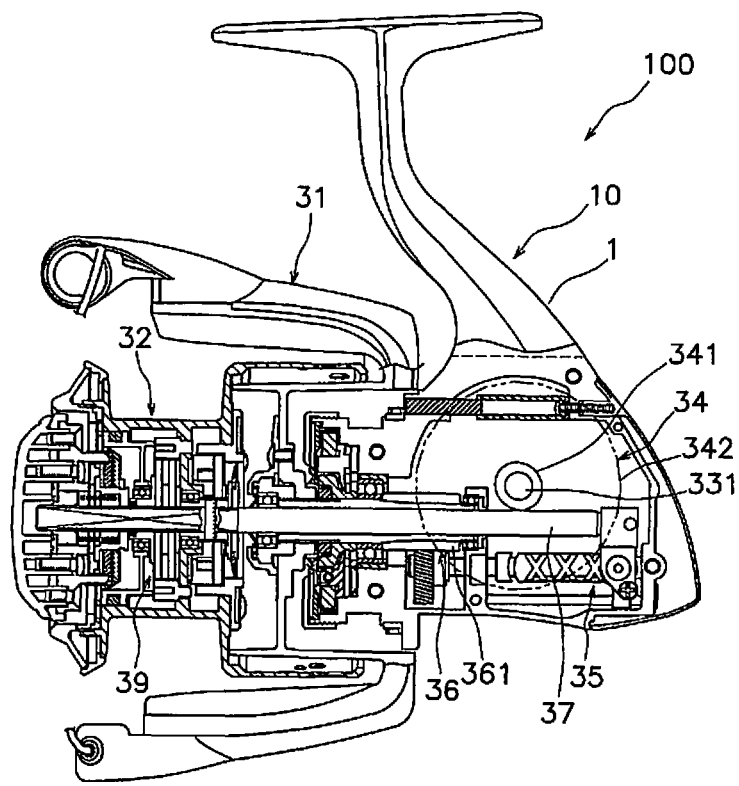
FIG. 2 is a cross-sectional view of a spinning reel.

As shown in FIG. 2, the reel body 10 comprises an internal space and houses various mechanisms in the internal space. In particular, the drive mechanism 34 and the oscillating mechanism 35 are housed in the reel body 10. The drive mechanism 34 comprises a drive shaft 341 and a drive gear 342.

Figure 3:
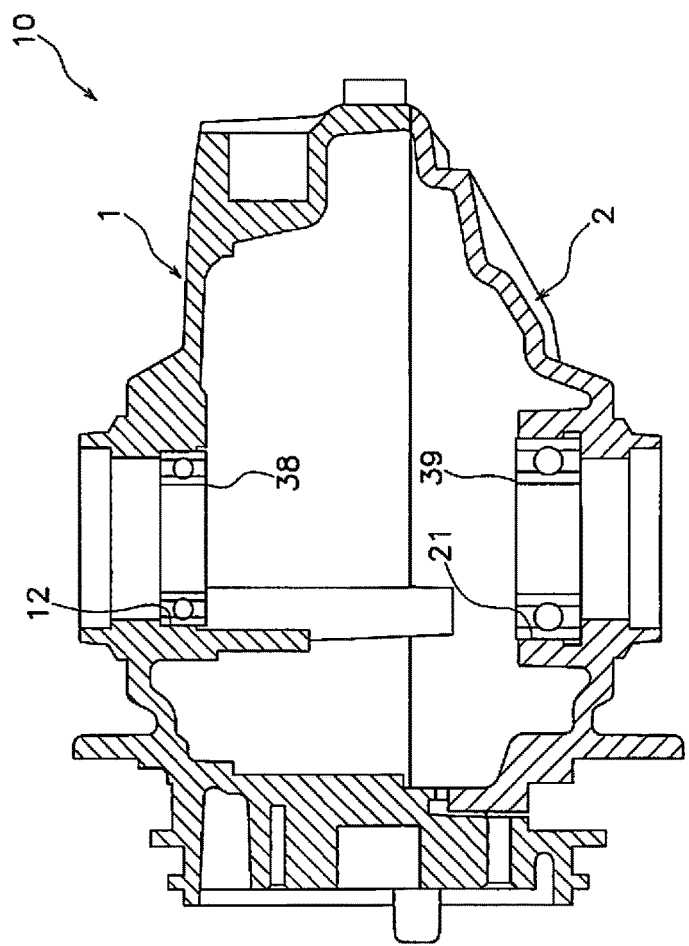
FIG. 3 is an A-A line cross-sectional view of the reel body.

The drive shaft 341 is coupled with a handle shaft 331 and integrally rotates with the handle shaft 331. As shown in FIG. 3, the spinning reel 100 further comprises a first axle bearing member 38 and a second axle bearing member 39. The first and the second axle bearing members 38 and 39 are mounted to the reel body 10 as discussed below, and they rotatably support the drive shaft 341. Meanwhile, FIG. 3 is an A-A line cross-sectional view of FIG. 1 that shows only the reel body 10 to which the first and the second axle bearing members 38 and 39 are mounted.

As shown in FIG. 2, the drive gear 342 is coupled to the drive shaft 341 and integrally rotates with the drive shaft 341. The drive gear 342 is a face gear and meshes with the gear portion 361 of the pinion gear 36. The drive shaft 341 and the drive gear 342 rotate by rotating the handle 33 that is mounted to the side surface of the reel body 10, and the pinion gear 36 also rotates.

As shown in FIG. 1, the reel body 10 comprises a case part 1 and a lid portion 2. The lid portion 2 can be detached from the case part 1. A coated surface is formed on the entire case part 1 and the lid portion 2 by electro-deposition coating. Meanwhile, the reel body 10 corresponds to the second component member of the present invention; more specifically, the lid portion 2 of the reel body 10 corresponds to the second component member of the present invention.

Figure 4:
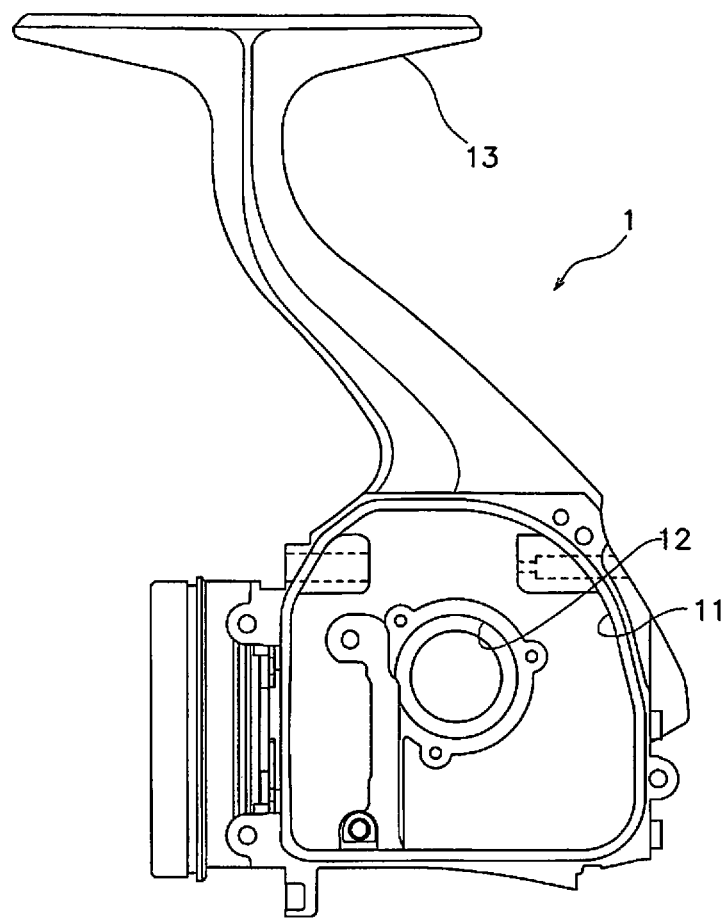
FIG. 4 is a side view of a case part.

FIG. 4 is a side view of the case part 1. As shown in FIG. 4, the case part 1 comprises an internal space 11 that opens to the side (the front side of the sheet in FIG. 4). The drive mechanism 34 and the oscillating mechanism 35, etc., mentioned above are stored in the internal space 11 of the case part 1. The case part 1 comprises a first fitting recess 12. The first axle bearing member 38 fits into the first fitting recess 12 (refer to FIG. 3). Also, the case part 1 comprises a mounting portion 13 that extends in the longitudinal direction. The mounting portion 13 is a portion that is mounted to the fishing rod.

Figure 5:
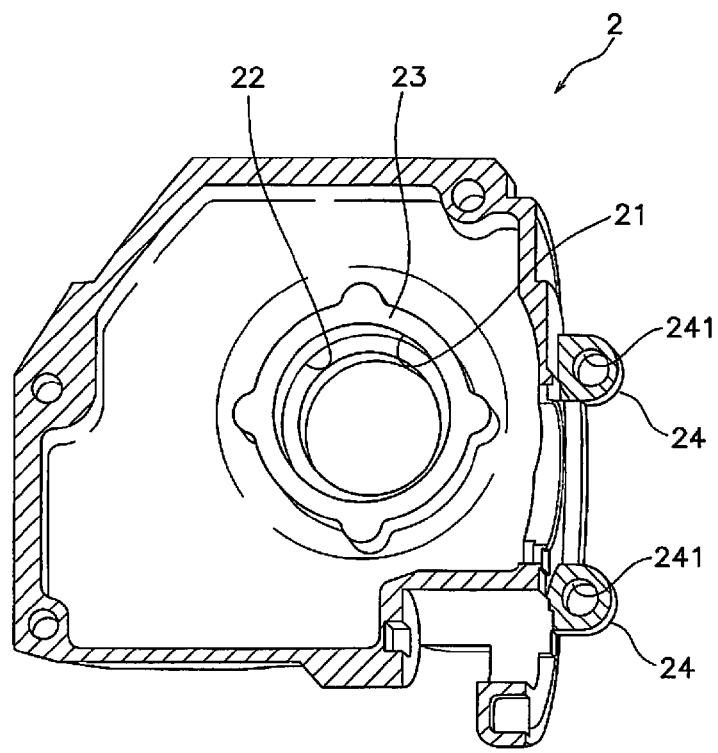
FIG. 5 is a perspective view of the lid portion.
Figure 6:
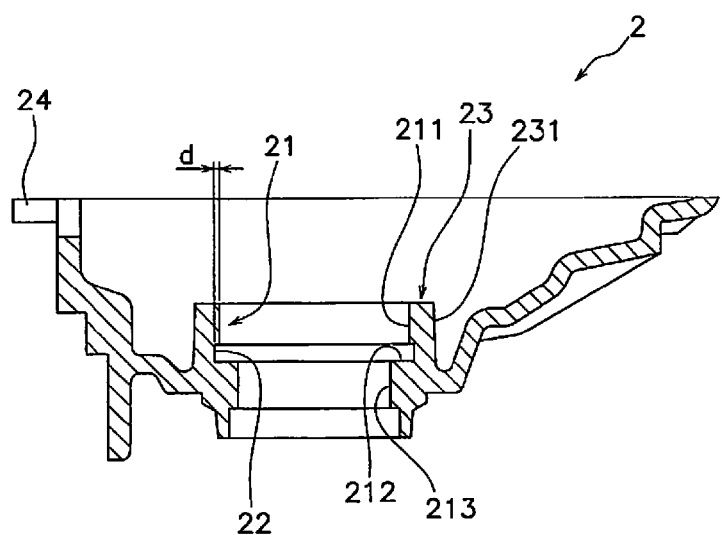
FIG. 6 is an A-A line cross-sectional view of the lid portion.

FIG. 5 is a perspective view of the lid portion 2, and FIG. 6 is a cross-sectional view of the A-A line in FIG. 1. Meanwhile, FIG. 6 shows only the lid portion 2. The lid portion 2 is a member for blocking the opening of the case part 1. As shown in FIG. 5 and FIG. 6, the lid portion 2 comprises a second fitting recess 21, a groove 22, and a side wall 23. Additionally, the second fitting recess 21 corresponds to the fitting recess of the present invention.

As shown in FIG. 6, the second fitting recess 21 comprises an inner surface 211 and a bottom surface 212. The second fitting recess 21 is fixed by the inner surface 211 and the bottom surface 212. A second axle bearing member 39 fits into the second fitting recess 21 (refer to FIG. 3). The inner surface 211 and the bottom surface 212 come into contact with the second axle bearing member 39.

The inner surface 211 is formed across the entire circumference of the second fitting recess 21. That is, the inner surface 211 forms a circumferential surface. A through-hole 213 is formed on the center portion of the bottom surface 212 of the second fitting recess 21. Accordingly, the bottom surface 212 is formed in an annular shape. Further, the handle shaft 331 and the drive shaft 341 extend through the through-hole 213.

The side wall 23 is formed in a nearly cylindrical shape. This side wall 23 comprises the inner surface 211 mentioned above and the outer surface 231.

The groove 22 is formed on the inner surface 211. In particular, the groove 22 is formed in an annular shape. That is, the groove 22 is formed across the entire circumference of the end of the inner surface 211 on the bottom surface 212 side. This groove 22 is formed by, for example, a T-slot. Meanwhile, the depth d of the groove 22 is not particularly limited and may be, for example, greater than or equal to around 0.1 mm and less than or equal to 2 mm.

As shown in FIG. 5, the lid portion 2 is configured to be hung on the case part 1. In particular, the lid portion 2 comprises a hanging portion 24. In the present embodiment, the lid portion 2 comprises two hanging portions 24. A through-hole 241 is formed on the hanging portion 24, and the lid portion 2 can be hung using this through-hole 241. Meanwhile, this through-hole 241 of the hanging portion 24 is also used as a hole to pass along a bolt for attaching the lid portion 2 to the case part 1.

As shown in FIG. 2, the spool shaft 37 is disposed in the reel body 10. In particular, the spool shaft 37 extends forward from inside of the reel body 10. The spool shaft 37 moves reciprocally in the longitudinal direction by rotation the handle 33. In particular, the rotation of the handle 33 rotates the pinion gear 36 via the drive gear 342. Accompanying the rotation of this pinion gear 36, the oscillating mechanism 35 reciprocally moves with the spool shaft 37 in the longitudinal direction.

The spool 32 is a member to which the fishing line is wound. The spool 32 is mounted to the distal end section of the spool shaft 37 via a drag mechanism 40. The spool 32 integrally and reciprocally moves with the spool shaft 37 in the longitudinal direction.

The pinion gear 36 is disposed in the reel body 10. In particular, the pinion gear 36 extends forward from inside of the reel body 10. The pinion gear 36 is rotatably disposed around the spool shaft 37. The pinion gear 36 is formed in a tubular shape, and the spool shaft 37 extends inside of the pinion gear 36. Meanwhile, the pinion gear 36 is supported by the reel body 10 via a plurality of axle bearing members.

The rotor 31 is a member for winding the fishing line onto the spool 32. The rotor 31 is fixed to the front portion of the pinion gear 36 and integrally rotates with the pinion gear 36. Therefore, the rotor 31 is non-rotatable relative to the pinion gear 36.

[Characteristics]

The spinning reel 100 according to the present embodiment has the following characteristics.

The spinning reel 100 comprises a reel body 10. The lid portion 2 of the reel body 10 comprises a second fitting recess 21 and a groove 22. The second axle bearing member 39 fits into the second fitting recess 21. The second fitting recess 21 comprises an inner surface 211 that contacts the second axle bearing member 39 and a bottom surface 212 that contacts the second axle bearing member 39. The groove 22 is formed on the inner surface 211.

According to this configuration, a groove 22 is formed on the inner surface 211 of the second fitting recess 21. For this reason, for example, when the lid portion 2 is immersed in a coating bath and then taken out from the coating bath in order to apply electro-deposition coating on the lid portion 2, the paint will not easily accumulate in the second fitting recess 21. Therefore, the excess paint that accumulates in the second fitting recess 21 can be collected in the groove 22, so that the paint does not easily accumulate in the second fitting recess 21, specifically, on the inner surface 211 that contacts the second axle bearing member 39 and the surface of the bottom surface 212 that contacts the second axle bearing member 39. Therefore, when the second axle bearing member 39 fits into the second fitting recess 21, the second axle bearing member 39 accurately fits into the second fitting recess 21. As a result, a reduction in the rotational accuracy due to a misalignment or the tilting of the axis of the axle bearing member can be prevented; therefore, a reduction in the dimensional accuracy of the spinning reel 100 can be prevented.

MODIFIED EXAMPLE

Although embodiments of the present invention have been presented, the present invention is not limited to these embodiments, and various modifications can be made without departing from the scope of the invention.

Modified Example 1

Figure 7:
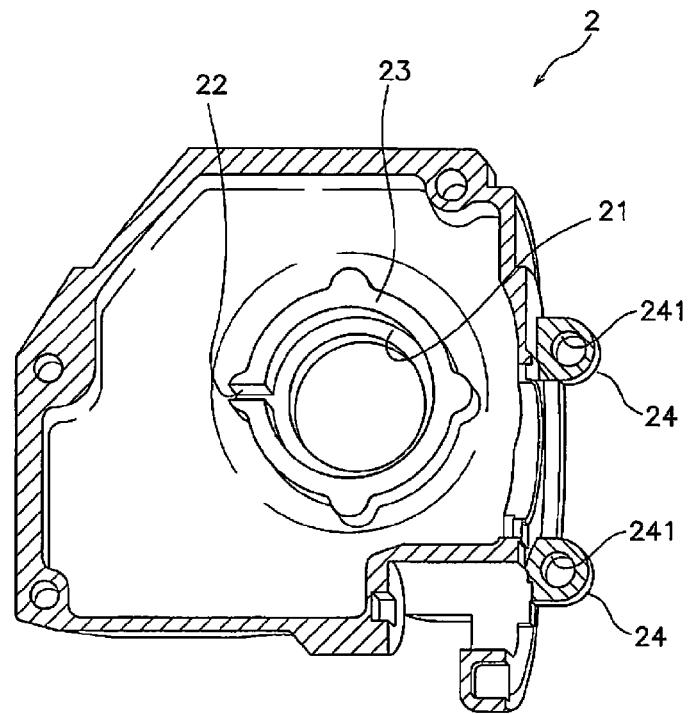
FIG. 7 is a perspective view of the lid portion according to a first modified example.

As shown in FIG. 7, the groove 22 can extend through the side wall 23 from the inner surface 211 toward the outer surface 231. In this configuration, the groove 22 is preferably not formed around the entire circumference of the inner surface 211 but is formed on only one portion thereof. Specifically, the groove 22 is preferably formed on the lower portion of the inner surface 211 in a state in which the lid portion 2 is hung. For example, the groove 22 is preferably formed on a position that is farthest from the hanging portion 24 on the inner surface 211. Additionally, the groove 22 preferably extends from the end of the side wall 23 on the bottom surface 212 side to the end of the distal end side. That is, the side wall 23 is separated by the groove 22.

Modified Example 2

Figure 8:
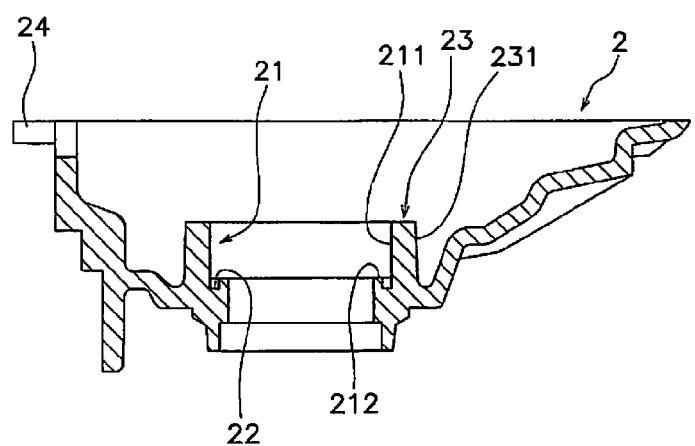
FIG. 8 is an A-A line cross-sectional view of the lid portion according to a second modified example.

In the above-described embodiment, the groove 22 is formed on the inner surface 211, but the configuration is not limited to this embodiment. For example, as shown in FIG. 8, the groove 22 can be formed on the bottom surface 212. In this configuration, the groove 22 is preferably formed on the end of the bottom surface 212 on the inner surface 211 side. Additionally, the groove 22 is preferably formed around the entire circumference of the bottom surface 212.

Modified Example 3

In the above-described embodiment, the lid portion 2 corresponds to the second component member of the present invention, but the configuration is not limited to this embodiment. For example, the case part 1 of the reel body 10 can also be configured to correspond to the second component member of the present invention. Specifically, a groove can be formed on the inner surface or on the bottom surface of the first fitting recess 12 of the case part 1 of the reel body 10.

Modified Example 4

In the above-described embodiment, an example in which the present invention is applied to a spinning reel was explained, but the present invention can also be applied to a dual-bearing reel.

What is claimed is:
1. A fishing reel, comprising:
a first component member, and
a second component member configured to fit with the first component member, and having a fitting recess and a groove, the fitting recess having an inner surface to contact the first component member, and a bottom surface to contact the first component member, and the groove being formed on at least one of the inner surface and the bottom surface, the first component member supporting a drive shaft, and being received in the fitting recess.
2. The fishing reel recited in claim 1, wherein
the inner surface is formed across an entire circumference of the fitting recess.
3. The fishing reel recited in claim 2, wherein
the groove is formed on an end of an entirety of the inner surface adjacent the bottom surface.
4. The fishing reel recited in claim 1, wherein
the second component member comprises a side wall that includes the inner surface and an outer surface.
5. The fishing reel recited in claim 4, wherein
the groove extends through the side wall from the inner surface toward the outer surface.
6. The fishing reel recited in claim 1, wherein
the second component member is configured to be mounted such that the groove is formed on a lower portion of the inner surface.
7. The fishing reel recited in claim 1, wherein
the second component member is a reel body.
8. The fishing reel recited in claim 1, wherein
the first component member is an axle bearing member.
9. The fishing reel recited in claim 1, wherein
the second component member comprises a coating layer which is formed by an electro-deposition coating.

* * * * *